Sept. 26, 1944.   C. E. JOHNSON   2,359,116
SHUTTER MECHANISM FOR CAMERAS
Filed Sept. 23, 1940   3 Sheets-Sheet 1
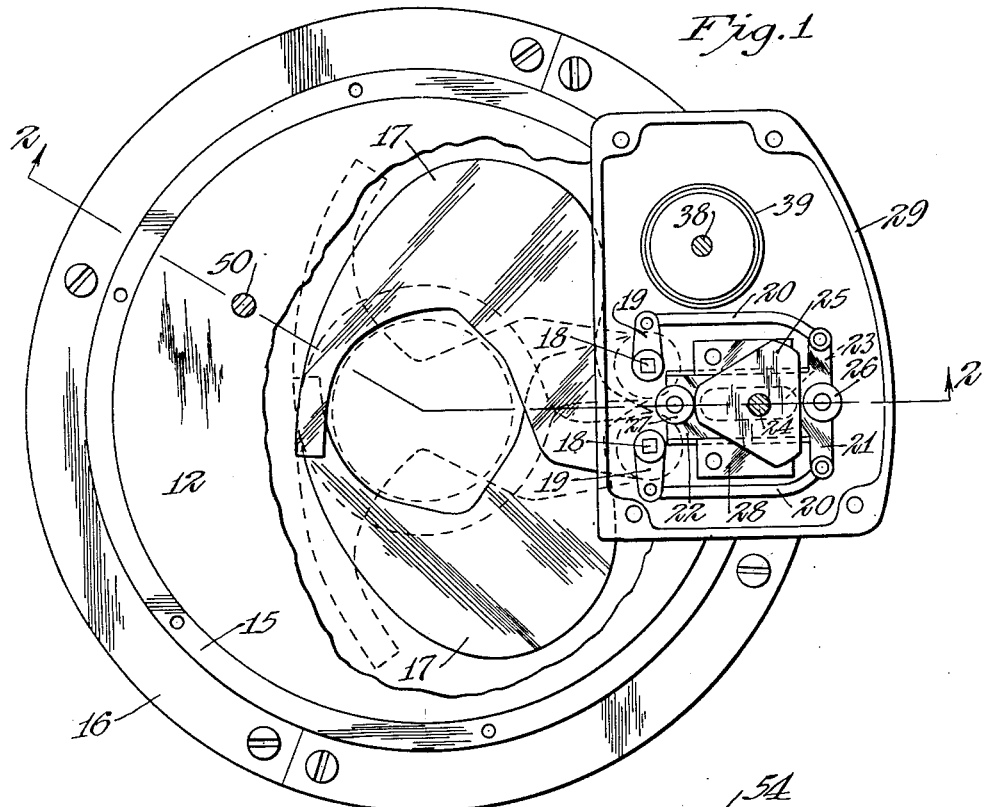
Inventor
Carl E. Johnson
By Williamson & Williamson
Attorneys Sept. 26, 1944.  C. E. JOHNSON  2,359,116
SHUTTER MECHANISM FOR CAMERAS
Filed Sept. 23, 1940  3 Sheets-Sheet 2
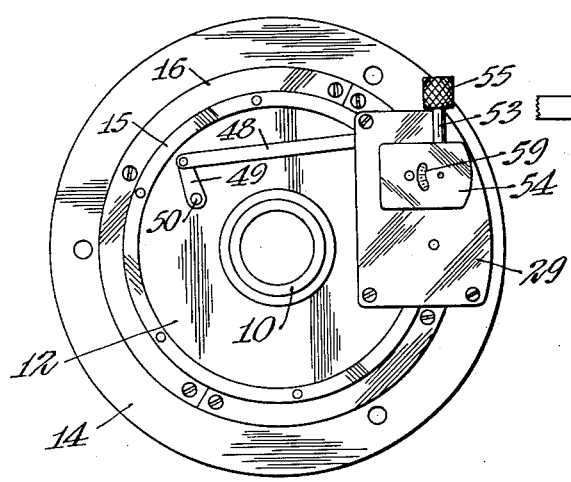
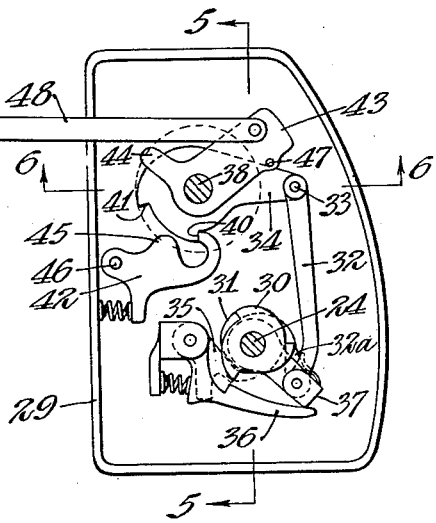
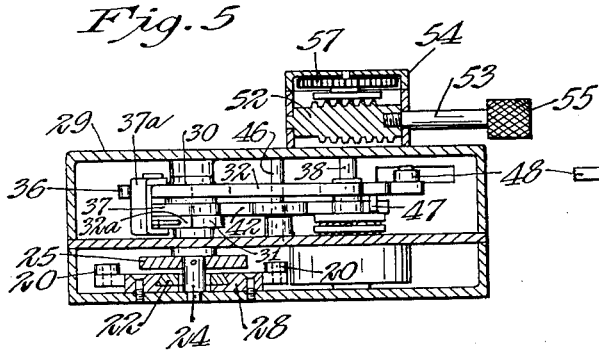
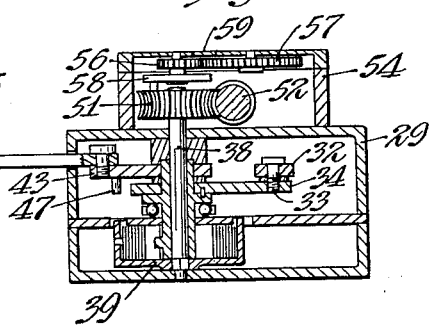
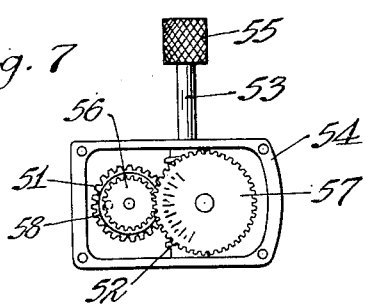
Inventor
Carl E. Johnson
By Williamson & Williamson
Attorneys Sept. 26, 1944.  C. E. JOHNSON  2,359,116
SHUTTER MECHANISM FOR CAMERAS
Filed Sept. 23, 1940  3 Sheets-Sheet 3

Inventor
Carl E. Johnson
By Williamson & Williamson
Attorneys

Patented Sept. 26, 1944

2,359,116

UNITED STATES PATENT OFFICE 2,359,116

SHUTTER MECHANISM FOR CAMERAS

Carl E. Johnson, St. Paul, Minn., assignor, by mesne assignments, to Mark Hurd Manufacturing Corporation, Minneapolis, Minn., a corporation of Minnesota Application September 23, 1940, Serial No. 357,935

4 Claims. (Cl. 95—63)

This invention relates to camera constructions and more particularly to shutter mechanism and the means for actuating the same.

It is an object of my invention to provide an improved form of shutter mechanism which will operate with extreme rapidity and which is particularly advantageous when used in connection with comparatively large camera lenses.

Another object of the invention is to provide power operated shutter mechanism with improved means for controlling the operation of the shutter in direct relation to the operation of the magazine control mechanism of the camera.

A further object of the invention is to provide power operated shutter mechanism in combination with means for positively locking and periodically releasing the power mechanism and also means for alternately locking and releasing the shutter for actuation by the power mechanism.

These and other objects and advantages of the invention will more fully appear from the following description made in connection with the accompanying drawings, wherein like reference characters refer to the same parts throughout the views, and, in which:

Fig. 1 is a plan view of a lens mounting showing a pair of shutter leaves in open position in full lines and in closed position in dotted lines as well as a sectional portion of the shutter actuating mechanism taken approximately on line 1—1 of Fig. 2 with the upper section thereof removed.

Fig. 2 is a section taken approximately on the line 2—2 of Fig. 1;

Fig. 3 is a plan view of the lens mounting and operating mechanism fully assembled;

Fig. 4 is a section through the casing of the operating mechanism taken approximately on the line 4—4 of Fig. 2;

Fig. 5 is a section taken approximately on the line 5—5 of Fig. 4;

Fig. 6 is a section taken approximately on the line 6—6 of Fig. 4;

Fig. 7 is a plan view of the tension indicator mechanism with the casing cover removed;

Figure 8:
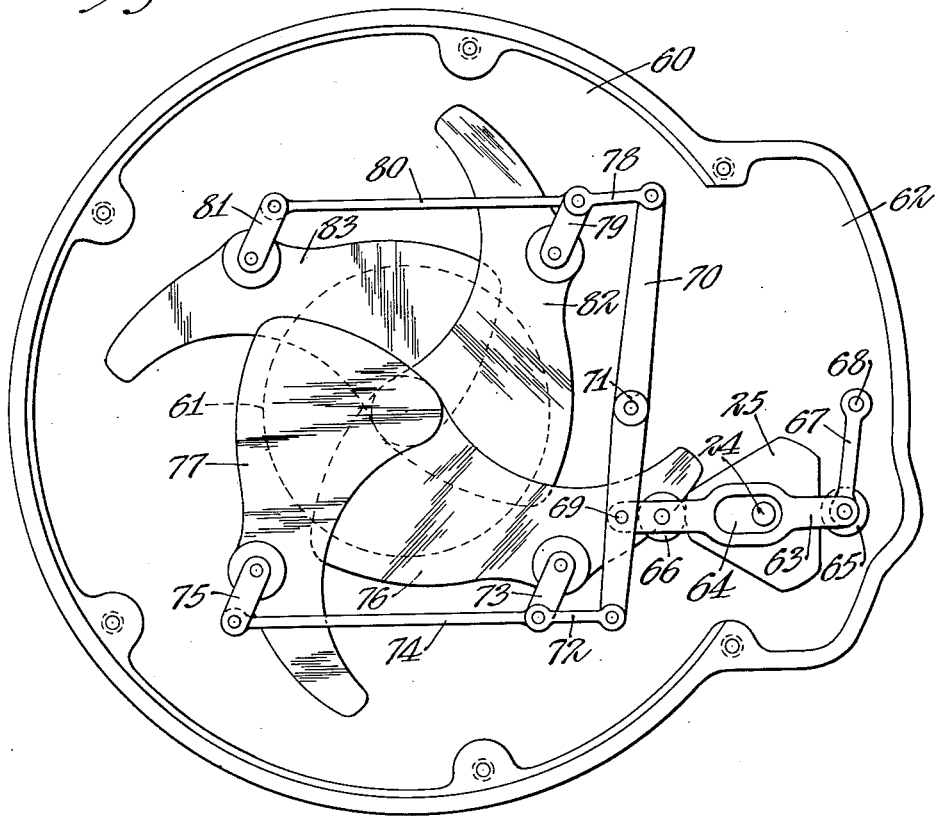
Fig. 8 is a plan view of a lens mounting showing a four leaf shutter and the means for connecting the leaves for operation by the shutter operating cam member.

In Figs. 1 and 2 there is shown a pair of lens elements 10 and 11 which are supported by lens mountings 12 and 13. These in turn are supported by a wall 14 of the camera casing. A focusing ring 15 is shown and a clamp 16 secures the lens mountings to the camera casing 14. The inner lens mounting 13 is keyed as at 13a in Fig. 2 to the camera casing 14 to permit rectilinear sliding movement of the mounting relative to the camera casing.

A pair of shutter leaves 17 are pivotally mounted at 18 and adapted to swing from the dotted closed position shown in Fig. 1 to the full line open position also shown in that figure. It will be seen that when the leaves are open their shape is such that they lie closely around the lens aperture and that when they are snapped shut they very quickly cover the aperture. Furthermore the shape of the leaves is such that there is movement inwardly toward the center of the aperture by portions of the leaves from nearly all directions at the same time. This provides an effective and quick acting shutter arrangement which is of particular advantage when used in connection with large lens elements.

Connected to each of the shutter leaf pivot shafts 18 are small cranks 19 and these cranks are connected by means of pivoted levers 20 to the cross head 21 of a slide block 22. The slide block 22 has an elongated aperture 23 formed therein to permit the block to move relative to a cam shaft 24. The cam shaft 24 carries a generally triangular cam 25 which is adapted to act against a pair of rollers 26 and 27, said rollers being carried by the slide block 22. The slide block 22 is slidably supported by a slide base 28.

The cam shaft 24 is mounted for rotary movement in a housing 29 and on said shaft is mounted a pair of ratchet cams 30 and 31. The cam 31 has teeth whose abutment faces face in a clockwise direction, and the cam 30 has teeth which face in a counterclockwise direction. A link 32 has its upper end connected at 33 with an auxiliary drive arm 34. Upward movement of the drive arm 34 will impart a counterclockwise rotational movement to the cam shaft 24. The driving cam 31 has a spring pressed ratchet 35 associated therewith to prevent movement of said cam in a reverse direction. The locking cam 30 has a dog 36 associated therewith which is adapted to abut the faces of teeth on said cam 30 to lock the shaft 24 against movement in its proper counterclockwise direction. The lower end of link 32 depresses the dog 36 when the drive arm 34 and link 32 are lowered to release the locking cam. If the link 32 and drive arm 34 are lifted the lower end of arm 32 will hold the locking dog 36 out of operative position until the cam shaft 24 is rotated to bring the dog out of locking relationship with said locking cam 31.

A shaft 38 supports the drive arm 34 for movement therewith and on one end of the shaft 38 is mounted a spring motor 39. The drive arm 34 is provided with a pair of abutments 40 and 41. The spring pressed dog 42 is adapted to engage one or the other of the abutments 41 to prevent and to limit rotational movement of the drive arm 34 under influence of the spring 39. A lever 43 is also mounted on the shaft 38 for movement thereon and for movement relative to the drive arm 34. The lever 43 has a cam member 44 which when the lever 43 is swung in a counterclockwise direction will encounter a releasing cam 45 on the dog 42. This will cause depression of the dog 42 due to movement on its pivot 46 to release the drive arm 34 and permit it to swing under influence of the spring 39 until the second abutment 41 on the drive arm 34 is encountered by the dog 42. The lever 43 has a pin 47 projecting therefrom so that it will encounter the drive arm 34 when said lever 43 is swung in a clockwise direction. Lever 43 is connected by means of a lever 48 to a crank 49 mounted on the end of a shaft 50, said shaft being connected with the magazine control mechanism of the camera, said mechanism not being shown but being conventional and well known in the art. The spring motor 39 on its shaft 38 is connected by means of a worm gear 51 and worm 52 to a winding shaft 53 which extends outwardly of the casing 54 and carries a knurled winding knob 55.

The casing 54 for the spring winding gears 51 and 52 also rotatably supports a pair of gears 56 and 57 which are connected by a crank pin unit 58 to the worm gear 51 for rotation therewith. As the winding shaft 53 is rotated to wind the spring 39 gears 56 and 57 will also rotate and suitable graduations on the face of gear 57 can be viewed through an aperture 59 in the face of casing 54. Thus it is impossible to determine the extent to which the spring 39 has been wound. The variation in spring tension is impotrant in controlling the speed of shutter operations which is necessary since different shutter speeds are required for different circumstances.

With the spring 39 wound to the desired degree of tension the shutter mechanism is in position for a cycle of shutter operation. The shutter leaves 17 are normally in the closed position indicated by dotted lines in Fig. 1. Upon actuation of the conventional magazine control mechanism the link 48 will first be moved to the right as viewed in Figs. 3 and 4 to depress the drive arm 34 and link 32 and release the dog 36 from engagement with the locking cam 30 on shaft 24. This also brings the spring pressed dog 32a into operative relationship behind one of the cam abutments on the driving cam 31. When the magazine control mechanism actuates the link 48 to move it to the left as viewed in Figs. 3 and 4 the lever 43 on shaft 38 will swing in a counterclockwise direction until its cam member 44 contacts and releases the spring pressed dog 42 from the abutment 40 on the drive arm 34. At this point the spring 39 will snap the drive arm in a counterclockwise direction and bring the abutment 41 on the drive arm 34 into engagement with the spring dog 42. This, of course, snaps the link 32 upwardly and swings the operating cam 31 and shaft 24 in a counterclockwise direction. Thereupon the substantially triangular cam 25 on the shaft 24 will act against the roller 26 on the cross head 21 of the sliding block 22 and pull the block to the right. This will cause the crank members 19 on the shutter leaf pivots 18 to snap to the right opening the shutter leaves to the full line position shown in Fig. 1. The triangular cam 25 will rotate through an arc of approximately 120 degrees to bring a succeeding flat side to the position shown in Fig. 1, and the shutter leaves will consequently be snapped back to a closed position.

The drive arm 34 in Fig. 4 will be restored to the position shown therein by movement of the lever 48 to the right causing the pin 17 to push the drive arm 34 around in a clockwise direction until the spring dog 42 again engages the abutment 40 on the drive arm 34.

In Fig. 8 there is shown the adaptation of my shutter drive to a four leaf shutter as differentiated from the two leaf shutter described above. In Fig. 8 there is shown a lens mount 60 and the dotted line 61 indicates the lens aperture. An iris diaphragm is normally positioned between the rear lens element or elements carried by the mounting 60 and the shutter unit by the diaphragm is omitted in the first described embodiment to clarify the showing of the shutter structure. The offset portion 62 at the right of the lens mounting 60 can be formed integrally with the mounting as shown rather than separately as in the other embodiment. The shaft 24 in Fig. 8 and generally triangular cam 25 are numbered the same as that shaft and cam in the first structure disclosed since they are identical and the locking cams, drive cams, spring motor and the release and reset are the same as above. For that reason they are not shown in Fig. 8.

A bar 63 lies adjacent the triangular cam 25 and is provided with an elongated central aperture 64 to permit movement of the bar 63 relative to cam shaft 24. Bar 63 is provided with a pair of roller members 65 and 66, the former being mounted on the right-hand end of bar 63, and the roller 66 being mounted for rotation adjacent the left-hand end of the bar 63. The right-hand end of this bar is pivotally connected to a lever 67 which has one end pivotally secured at 68. The left-hand end of the bar 63 is pivotally connected at 69 to a rocker arm 70 which in turn is pivoted at its center as at 71. It will be noticed that the distance between the pivots 69 and 71 is the same as the length of the lever 67, and the width of the aperture 64 in the bar 63 is greater than the diameter of the cam shaft 24 to permit the bar 63 to be rocked back and forth freely from its pivot points 68 and 71.

The rocker arm 70 at its lower end is connected by a short link 72 to a crank 73 and said crank is also connected by a longer link 74 to a crank 75. The cranks 73 and 75 when moved are adapted to rotate pivotally mounted shutter leaves 76 and 77.

The upper end of the rocker arm 70 is connected by a short link 78 to a crank 79, and said crank 79 is connected by a longer link 80 to a crank 81. Crank 79 is connected also with a shutter leaf 82 to actuate the same, and the crank 81 connects with a pivoted shutter leaf 83.

When the shutter mechanism is tripped and the spring motor 39 through its connection with the cam shaft 24 actuates said shaft, the substantially triangular cam 25 will rotate against the roller 65 to swing the bar 63 to the right. This will move the rocker arm 70 in a counterclockwise direction on its pivot 71. The lower end of the rocker arm 70 will swing the cranks 73 and 75 in a counterclockwise direction and similarly move the shutter leaves 76 and 77 to bring them out of registration with the lens aperture 61. Simultaneously the cranks 79 and 81 will in like manner withdraw the shutter leaves 82 and 83 across the aperture 61 so that the lens aperture is completely uncovered, and as the cycle of shutter operation is completed through a 120 degree movement of the cam 25 said cam will return to the position shown in Fig. 8 and cause the rocker arm 70 to act upon the cranks 73, 75, 79 and 81 to bring the shutter leaves together to a position indicated in Fig. 8.

While the general principle of operation of the two leaf shutter and that of the four leaf shutter is the same, I have shown and described the operating connections for both types of shutters since the shutter connections themselves are different. The four leaf shutter is of particular advantage for use with lenses of larger diameter and with an increase in the movement of leaves it is necessary that each leaf travel a shorter distance than would be required for two leaves with the same diameter of lens opening.

Figure 9:
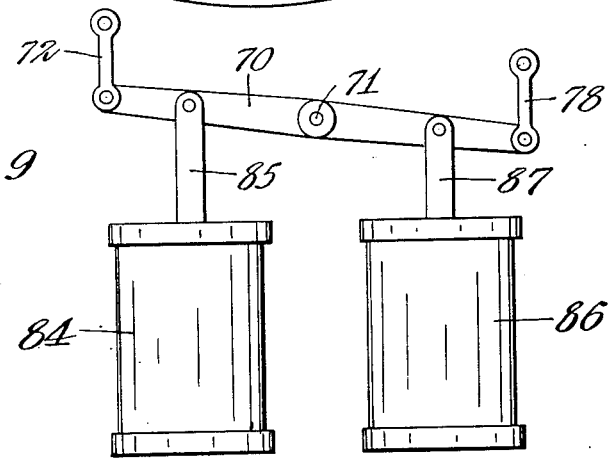
Fig. 9 is a fragmentary view of a portion of the drive connections in Fig. 8 with an electrical drive substituted for the cam.

In Fig. 9 there is shown the rocker arm 70 on the pivot 71 and having the two short links 72 and 78 which are adapted to connect respectively with the shutter cranks 73 and 79. However, I have shown a different form of drive mechanism from the type utilized in connection with the above described structures. In this view there is shown a solenoid 84 having a core 85 connected to the rocker arm 70 between its pivot point 71 and the link 72. There is a second solenoid 86 having a core 87 connected to the rocker arm between the pivot point 71 and the link 78. In an electrically operated camera the solenoid shutter actuation is of advantage and the two solenoids can be alternately energized to oscillate the rocker arm 70 and actuate the shutter leaves.

From the foregoing description it will be seen that I have provided a compact shutter mechanism which can be synchronized with the camera magazine control mechanism and which is capable of extremely efficient operation. While the magazine control mechanism provides the movement for releasing and resetting the shutter operating unit the actual shutter movement is produced by the action of the spring 39 which is under such tension that instantaneous shutter operation results. In addition the multiple leaf shutter shown and described herein is particularly advantageous for use with large camera lenses and due to the fact that shutter leaf portions move away from and toward the lens center from nearly all directions about the center the shutter leaves quickly open and close to get the desired exposure effect. This feature in combination with the quick action of the spring control operating means provides for high speed shutter movement even where the lens is unusually large and considerable area must be exposed and recovered.

It should be noted that the locking cam on the shaft 24 remains in locking position at all times except during an actual shutter operating cycle to prevent the shutter mechanism from bouncing and partially opening at undesired times.

While I have shown and described my invention in connection with shutter mechanism for photographic cameras it should be understood that the invention is equally adaptable for use with motion picture projectors, and actual tests have shown that the mechanism operates smoothly at extremely high speeds with continuous movement so that it is equally adaptable for use as a stroboscope. High speed actuation is not only smooth but the operation is exceedingly quiet.

Attention is also called to the lens mount adjusting ring 15 which can be rotated to bring the lens mount in or out with respect to the main camera casing 14, and the key connection between the lens mount and the camera casing which prevents the mount from twisting relative to the casing. This adjustment without twisting is important in connection with camera lenses where a vertical lens line must be accurately maintained. With my structure once the lens is properly positioned with respect to a vertical line the lens mount can be moved inwardly or outwardly without disturbing this adjustment.

It will, of course, be understood that various changes may be made in the form, details, arrangement and proportions of the various parts without departing from the scope of my invention.

What is claimed is:

1. In a camera, a lens mounting having a lens aperture therein, a shutter leaf mounted for pivoted movement into and out of alignment with said lens aperture, a shutter actuating shaft connected to said shutter leaf, a rotatable power transmitting shaft mounted substantially parallel to said shutter actuating shaft, a lever extending radially from said power transmitting shaft, a lever extending radially from said shutter actuating shaft and of materially less length than said first mentioned lever, and a link connecting the ends of said levers, said shutter lying in and being movable in a plane normal to the axes of said shutter actuating and power transmitting shafts.

2. In a camera, a lens mounting having a lens aperture therein, shutter means arranged for movement into and out of alignment with said lens aperture, a power device connected to said shutter means for actuating the latter, the connection between said power device and said shutter means including a pair of levers having inner pivoted ends and outer swinging ends, one of said levers being connected to said power device and the other of said levers having a connection with said shutter means, a link pivotally connected between the swinging ends of said levers, said levers and link being movable to two positions, the first position being with said shutter lever and said link forming an acute angle and said second position being with the pivotal axis of said shutter lever and the pivots at the ends of said link nearly in alignment, and said connection between said shutter lever and shutter including a shutter opening and closing device operable through an opening and closing cycle upon movement of said levers from their first position to their second position.

3. In a camera, a lens mounting having an aperture therein, a shutter arranged for oscillatory movement into and out of alignment with said lens aperture, power operated means having a unidirectional rotary shutter operating movement and connected to said shutter for actuating the latter, a latch releasably connected to said power operated means to hold it against movement, a lost motion connection between said latch and said shutter, a lock for releasably securing said shutter, and means for actuating said latch to secure said power operated means prior to securing of said shutter means by its lock.

4. In a camera, a pivoted leaf shutter, a reciprocating member pivotally connected to said shutter to swing it open and closed, said reciprocating member having a pair of fixedly spaced cam followers thereon, a cam mounted between said followers and having high and low sides, a high side being opposite a low side, the high sides of said cam being reduced at their outer portions, and means for rotating said cam.

CARL E. JOHNSON.